United States Patent [19]

Milichichi et al.

[11] Patent Number: 5,067,247
[45] Date of Patent: Nov. 26, 1991

[54] APPARATUS FOR INSTALLING A BOX INTO A WALL

[76] Inventors: Gilbert Milichichi, 39095 Zacate Ave., Fremont, Calif. 94539; Richard G. Milichichi, 525 Saddleback Ct., Fremont, Calif. 94536

[21] Appl. No.: 673,677

[22] Filed: Mar. 22, 1991

[51] Int. Cl.⁵ .......................... B25B 11/00; B25B 3/00
[52] U.S. Cl. .................................. 33/613; 33/DIG. 10
[58] Field of Search .......................... 33/613, DIG. 10

[56] References Cited

U.S. PATENT DOCUMENTS

| | | | |
|---|---|---|---|
| 2,956,798 | 12/1960 | Briggs | 33/DIG. 10 X |
| 2,990,172 | 6/1961 | Gianotta | 33/DIG. 10 X |
| 3,601,386 | 8/1971 | Estep | 33/DIG. 10 X |
| 4,890,391 | 1/1990 | Warren | 33/DIG. 10 X |
| 4,901,447 | 2/1990 | Gottschalk | 33/DIG. 10 X |

Primary Examiner—Harry N. Haroian
Attorney, Agent, or Firm—Flehr, Hohbach, Test, Albritton & Herbert

[57] ABSTRACT

An apparatus for installing a box into a wall is disclosed. The apparatus includes a fastener which is attached to a sleeve. The fastener holds the box which is to be installed into the wall. More particularly, the fastener holds the box at a position corresponding to the desired depth at which the box will be positioned in the wall. The sleeve fits over a pipe and may be secured to the pipe by a collar. The pipe includes markings designating various vertical heights at which a box is commonly located in respect to the wall. The sleeve may be fixed at a designated vertical height by the collar. The box is installed into the wall while the fastener holds the box at the desired depth and the collar holds the box at the desired height.

10 Claims, 3 Drawing Sheets

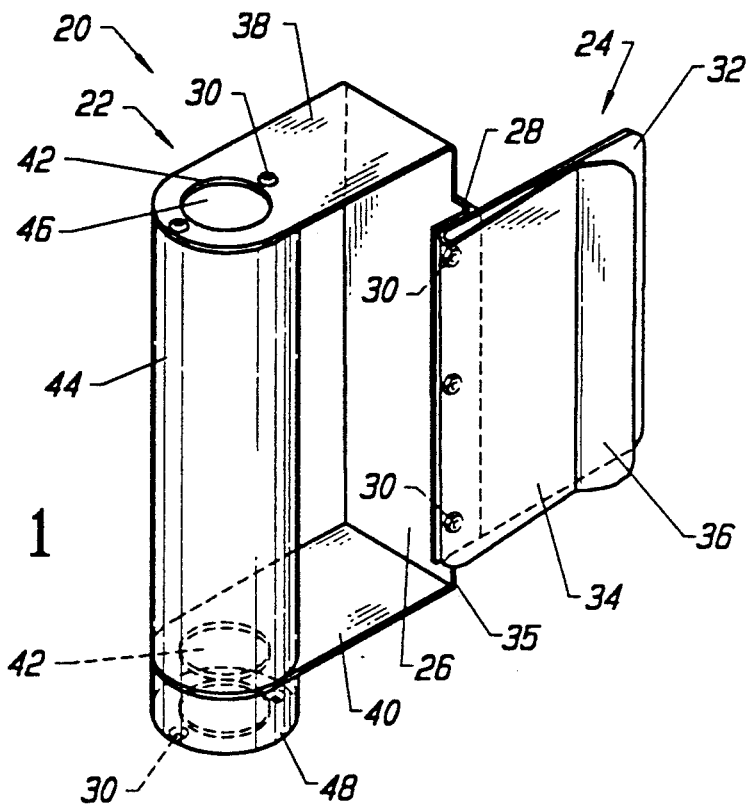
FIG. 1
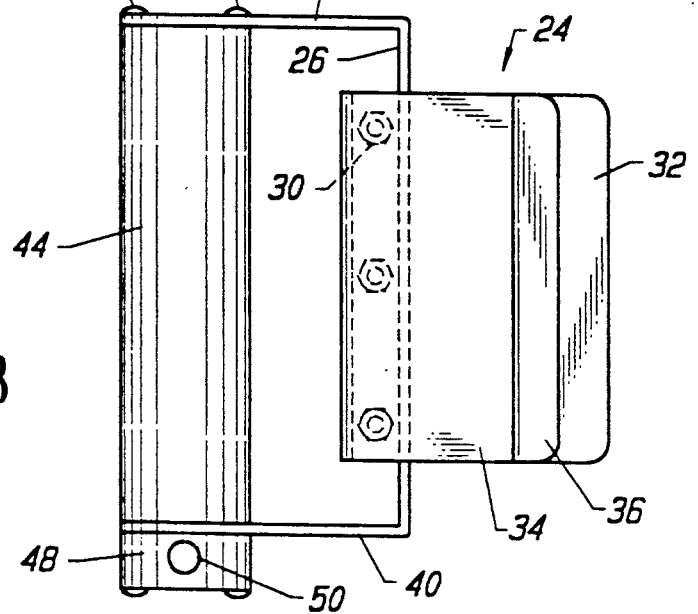
FIG. 2
FIG. 3

APPARATUS FOR INSTALLING A BOX INTO A WALL

BRIEF DESCRIPTION OF THE INVENTION

This invention relates to an apparatus which may be used to facilitate installation of a box into a wall. More particularly, this invention relates to an apparatus which rapidly positions an electrical outlet box at a proper vertical and horizontal location in respect to a wall and facilitates permanent installation of the box at that location.

BACKGROUND OF THE INVENTION

During construction and remodeling of a building it is usually necessary to install several electrical outlet boxes into the walls of each room in the building. These electrical boxes are known in the art to house electric sockets (or receptacles) and light switches. Since each room in a building typically includes several boxes, it is readily appreciable that installing these boxes can become a labor-intensive and time consuming undertaking.

For each box which is installed, the appropriate vertical location must be found. This usually requires that the location be determined with the use of a tape measure. Therefore, the individual must carry a tape measure and juggle the tape measure with other tools which are being used to install the box. This juggling of equipment is awkward and inefficient.

In addition to determining the proper vertical height, the individual must find the proper horizontal location for the box. That is, the box must be positioned such that it is flush with the finished sheetrock wall. This location is generally found after a time consuming process of moving the box to a number of positions.

Once the proper location for the box is found, it must be held by the individual while it is permanently affixed to the wall by hammering or a similar method. Holding the box while simultaneously affixing it to the wall is error-prone. That is, the box may slip from the individual's hold or it may be jarred during the affixing process. In either case, the box will not be positioned properly and may have to be reinstalled.

The problems associated with installing a single box are multiplied for each box for each room in each building. As a result, the installation of these boxes becomes a time consuming and inefficient process.

OBJECTS AND SUMMARY OF THE INVENTION

It is a general object of the present invention to provide an apparatus for facilitating the rapid installation of a box into a wall.

It is another object of the present invention to provide an apparatus which rapidly locates the proper vertical position for the box to be installed.

It is a related object of the present invention to provide an apparatus which rapidly locates the proper horizontal position of the box to be installed.

It is still another object of the present invention to provide an apparatus which securely holds a box while it is being installed into a wall.

These and other objects are obtained by an apparatus for installing a box into a wall. The apparatus includes a fastener which is attached to a sleeve. The fastener holds the box which is to be installed into the wall. More particularly, the fastener holds the box at a position corresponding to the desired depth at which the box will be positioned in the wall. The sleeve fits over a pipe and may be secured to the pipe by a collar. The pipe includes markings designating various vertical heights at which a box is commonly located in respect to the wall. The sleeve may be fixed at a designated vertical height by the collar. The box is conveniently installed into the wall while the fastener holds the box at the desired depth and the collar holds the box at the desired height. Thus, the box may be conveniently positioned and rapidly secured at the desired location without the need for inaccurate and time consuming manual measurements.

BRIEF DESCRIPTION OF THE DRAWINGS

Other objects and advantages of the invention will become apparent upon reading the following detailed description and upon reference to the drawings, in which:

FIG. 1 is a perspective view of an installation apparatus in accordance with the present invention.

FIG. 2 is a side view of an installation apparatus in accordance with the present invention.

FIG. 3 is a top view of an installation apparatus in accordance with the present invention.

DETAILED DESCRIPTION OF THE INVENTION

Figure 4:
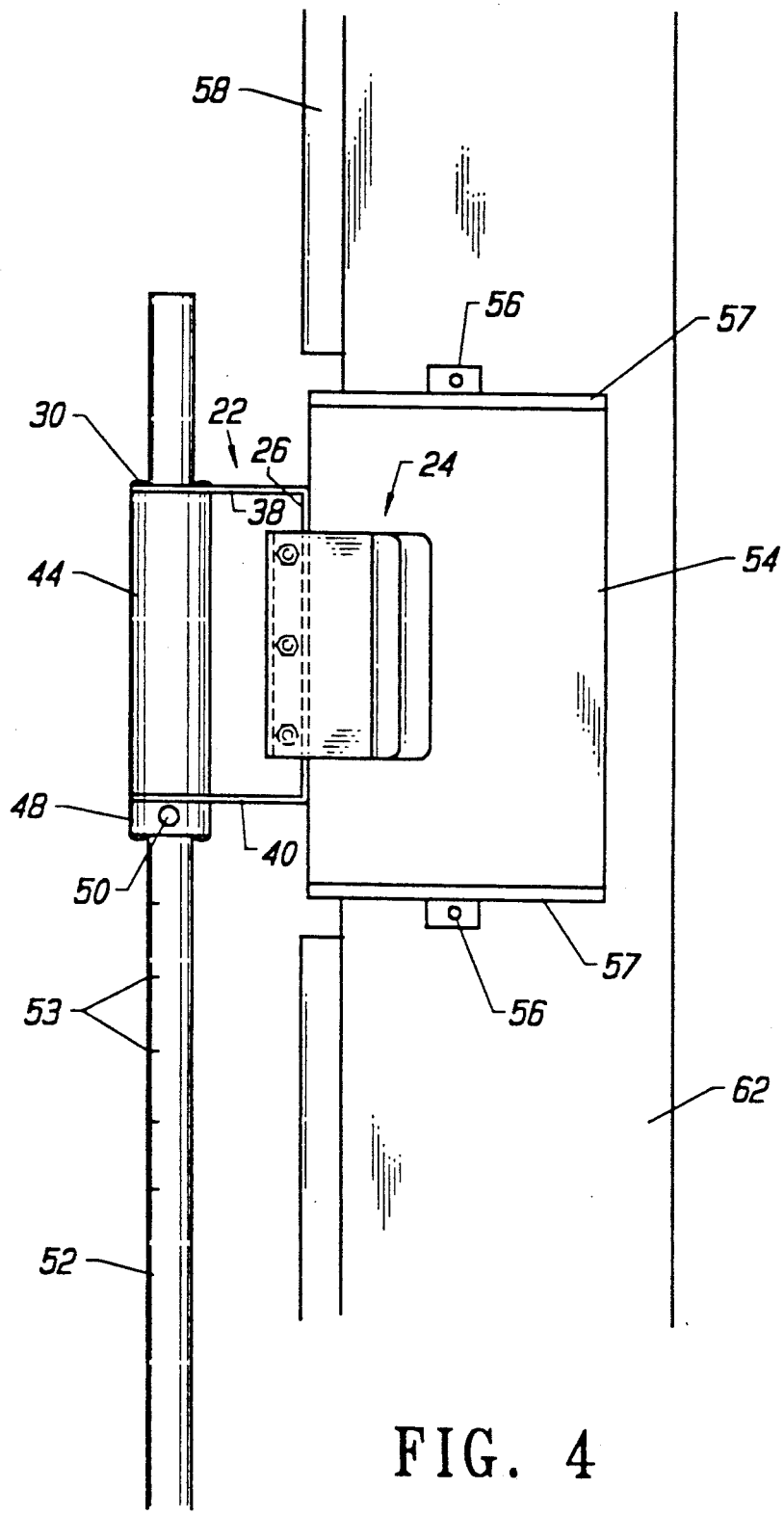
FIG. 4 is a side view of an installation apparatus in accordance with the present invention holding a box which is to be installed into a wall.

Turning now to the drawings, wherein like components are designated by like reference numerals in the various figures, attention is initially directed to FIG. 1. FIG. 1 depicts an installation apparatus 20 in accordance with the present invention. The installation apparatus 20 preferably includes a handle 22 which is attached to a clip 24.

The handle 22 preferably includes a central vertical support 26. In a preferred embodiment, the central support 26 includes a flange 28 which may be utilized for attachment to the clip 24. As more fully appreciated in FIG. 3, clip 24 preferably includes leaf 32 which is coupled to resilient face 34 by curved coupling 35. Clip 24 preferably includes lip 36. Leaf 32 is preferably attached to flange 28 by a number of fasteners 30.

Advantageous dimensions for one configuration of the present invention are as follows. The length of the central vertical support 26 may be approximately 4.65 inches with a width of approximately 1.25 inches. The length of the clip 24 and flange 28 may be approximately 3.38 inches. The depth of the clip 24, that is the dimension which is perpendicular to the face (or width) of the central support 26, is preferably 2.47 inches.

Preferably, at one end of the central vertical support 26 is a first arm 38 which includes a first end and a second end. The first end of first arm 38 is attached to central support 26 while the second end of first arm 38 includes an aperture 42. At the other end of central support 26 is a second arm 40 which includes a first end and a second end. The first end of second arm 40 is attached to central support 26 while the second end of second arm 40 includes an aperture 42.

A sleeve (grip) 44 is positioned between the first arm 38 and second arm 40. Sleeve 44 includes conduit 46 running along the length of its longitudinal axis. Conduit 46 is preferably aligned with apertures 42 of the two arms. Sleeve 44 is preferably attached to first arm 38 and second arm 40 by fasteners 30.

Advantageous dimensions for these features are as follows. Sleeve 44 is preferably the same length as central vertical support 26, that is, 4.65 inches. First arm 38 and second arm 40 are preferably 2.70 inches long and 1.25 inches wide. The diameter of the aperture 42 and conduit 46 is preferably 0.75 inches. The diameter of the sleeve 44 is preferably 1.25 inches.

Sleeve 44 is preferably formed of plastic tubing. Handle 22 may be zinc plated while clip 24 may be formed of stainless steel or spring steel.

A collar 48 is preferably positioned beneath sleeve 44. Collar 48 is preferably 0.56 inches long and is otherwise identical to sleeve 44 in its diameter dimensions. Collar 48 also preferably includes a brace 50 which may be a set screw. Specifically, brace 50 may be adjusted to secure itself to a pipe positioned within conduit 46, as to be more fully described herein.

Collar 48 and brace 50 are more fully appreciated with reference to FIG. 2. FIG. 2 and FIG. 3 provide alternate views of the installation apparatus 20 of the present invention.

Turning to FIG. 4, the actual use of the installation apparatus 20 is disclosed. Specifically, handle 22 and clip 24 are depicted. An additional feature, pipe 52 is also disclosed. Pipe 52 is positioned through conduit 46 of sleeve 44 and preferably extends to the floor. Pipe 52 is preferably a ½ inch thinwall trade size conduit. By use of brace 50, the handle 22 may be affixed to the pipe 52 at a specific location. This location may be determined by pipe markings 53 which represent typical vertical heights at which boxes need to be installed into walls.

In FIG. 4 it can be seen that clip 24 is affixed to an electrical box 54. Electrical box 54 includes a number of side mounting projections 56. Side mounting projections 56 are used to guide a fastener, such as a nail. Specifically, the electrical box 54 is attached to a stud wall member 62 by a fastener which is driven through side mounting projections 56 into stud wall member 62. Side mounting projections 56 are typically used with electrical boxes installed in residential buildings. After the electrical box 54 is installed, sheet rock 58 is placed over the stud wall member 62.

In the prior art, the vertical positioning of electrical box 54 would be determined by using a tape measure to determine the proper vertical height for the box 54. This location would be marked, the tape measure would be dropped, and the individual would place the electrical box at the location manually. The individual would then move the electrical box 54 to a proper horizontal depth, that is, a proper distance into the wall (from left to right in FIG. 4). Thereafter, the electrical box 54 would be held manually while fasteners, such as nails, would be driven through apertures in mounting projections 56. In this approach, the measured setting, which is held manually, is often disrupted while the fasteners are applied. As a result, the box 54 must be removed, and the entire process repeated.

With the present invention, the proper horizontal depth is immediately established when the clip 24 is attached to the electrical box 54. That is, by pushing the box 54 against curved coupling 35 of the clip 24, the proper horizontal depth is established. Of course, other desirable depths may be established by markings on the clip or by altering the dimensions of the clip.

The vertical height is also immediately established with the present invention. Specifically, pipe markings 53 may be used to establish the proper vertical height. The handle 22 may be set at that location by brace 50.

Thus, with the vertical and horizontal locations of box 54 quickly established, and these locations essentially locked into position, the box 54 may then be attached by conventional means. Thus, in this approach, manual measurements are avoided. In addition, problems associated with manual positioning of the box are avoided.

Figure 5:
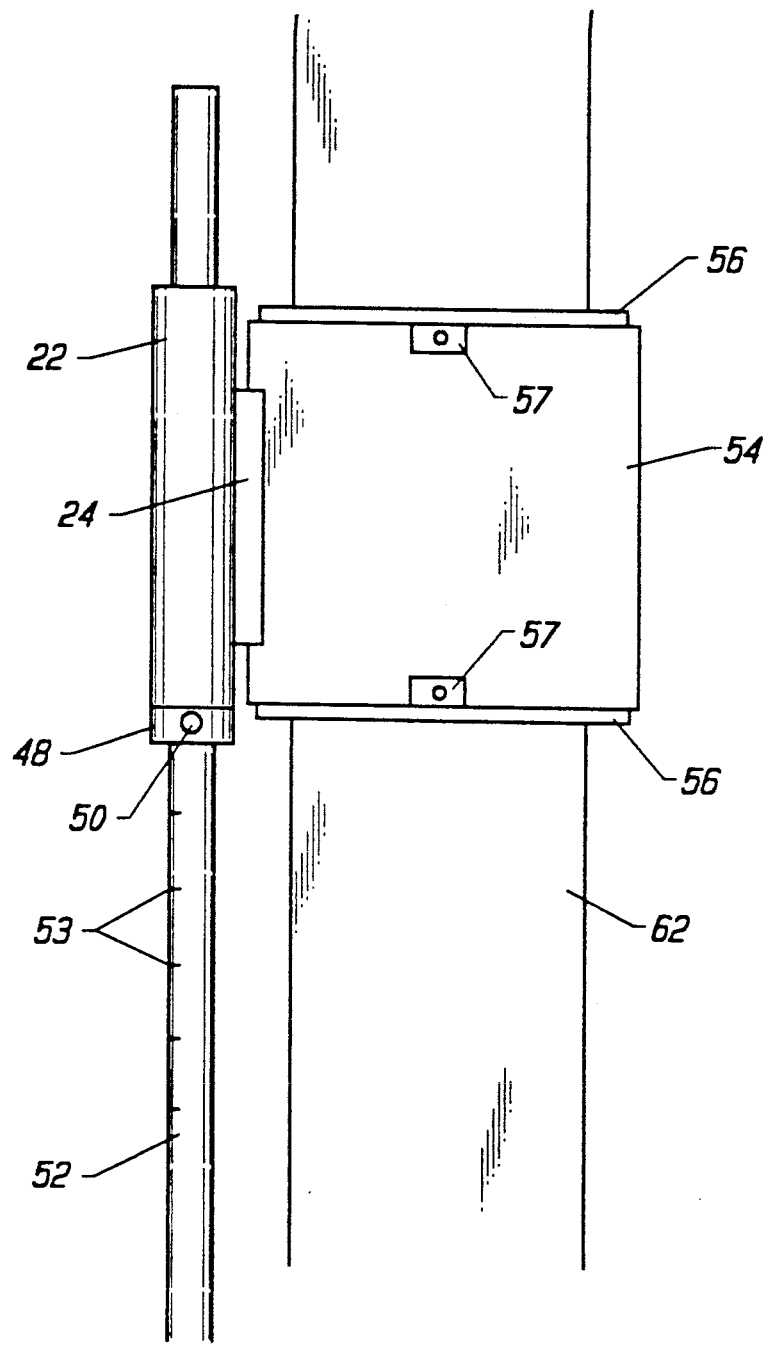
FIG. 5 is a front view of an installation apparatus in accordance with the present invention holding a box which is to be installed into a wall.

FIG. 5 depicts a front view of the installation apparatus 20 of the present invention. Again, clip 24 holds electrical box 54. Clip 24 is coupled to handle 22 and pipe 52 is secured to handle 22 by brace 50. In contrast to the embodiment depicted in FIG. 4, in this figure the electrical box 54 is being installed directly onto the front of stud wall member 62 (instead of to the side of the stud wall member). In this embodiment, forward mounting projections 57 are utilized, instead of side mounting projections 56.

Other embodiments of the present invention are readily derived from the disclosure herein. For instance, both a first arm 38 and a second arm 40 are not necessary. Pipe 52 need not extend to the floor, it may measure the proper vertical distance by relying upon measurements in relation to the stud wall member 62. Clip 24 may be any type of fastening device.

Thus, the foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for installing a box into a wall, comprising:
   (A) a fastening member for temporarily securing a box to be installed into a wall; and
   (B) a positioning member coupled to said fastening member, said positioning member including a handle wherein said handle includes
   (1) a central vertical support;
   (2) an arm including a first and a second end, said first end connected to said central vertical support; and
   (3) a sleeve attached to said arm proximate to said second end of said arm, said sleeve including a central longitudinal axis with a conduit along the length of said longitudinal axis, said positioning member vertically positioning said box at a desired location in respect to said wall such that said box may be permanently secured at said location while said fastening member holds said box.

2. The apparatus of claim 1 wherein said conduit of said sleeve receives a pipe for positioning said box at a desired vertical location in respect to said wall.

3. The apparatus of claim 2 wherein said pipe is affixed beneath said sleeve by a collar and a brace.

4. The apparatus of claim 3 wherein said pipe includes a plurality of markings representing vertical heights at which said box is commonly installed into said wall.

5. The apparatus of claim 1 wherein said fastening member includes a clip for holding said box.

6. The apparatus of claim 5 wherein said box is held by said clip at a depth corresponding to the depth at which said box will be positioned in said wall.

7. An apparatus for installing a box into a wall, comprising:
- a central vertical support including a first end and a second end;
- a first arm connected proximate to said first end of said central vertical support, said first arm including an aperture;
- a second arm connected proximate to said second end of said central vertical support, said second arm including an aperture;
- a sleeve including a longitudinal axis with a conduit extending the length of said longitudinal axis, said conduit being aligned with said aperture of said first arm and said aperture of said second arm, said sleeve being affixed to said first arm and said second arm;
- a flange positioned between said first arm and said second arm on said central vertical support; and
- a clip, attached to said flange, for holding a box to be installed into a wall.

8. The apparatus of claim 7 further comprising a collar and a brace positioned beneath said sleeve.

9. The apparatus of claim 8 further comprising a pipe positioned within said conduit and attachable proximate to said sleeve by said brace.

10. The apparatus of claim 9 wherein said pipe extends from the ends of said sleeve and includes a plurality of markings representing vertical heights at which said box is commonly installed into said wall.

* * * * *